US012560938B2

(12) United States Patent
Dwivedi

(10) Patent No.: US 12,560,938 B2
(45) Date of Patent: Feb. 24, 2026

(54) TASK EXECUTION SYSTEM, TASK EXECUTION METHOD, AND TASK EXECUTION PROGRAM

(71) Applicant: HITACHI, LTD., Tokyo (JP)

(72) Inventor: Sanjay Kumar Dwivedi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 186 days.

(21) Appl. No.: 18/335,363

(22) Filed: Jun. 15, 2023

(65) Prior Publication Data

US 2024/0045439 A1 Feb. 8, 2024

(30) Foreign Application Priority Data

Jul. 28, 2022 (JP) ................................. 2022-120839

(51) Int. Cl.
| | |
|---|---|
| *G05D 1/00* | (2024.01) |
| *G06T 7/13* | (2017.01) |
| *G06T 7/70* | (2017.01) |

(52) U.S. Cl.
CPC ......... *G05D 1/0246* (2013.01); *G05D 1/0278* (2013.01); *G06T 7/13* (2017.01); *G06T 7/70* (2017.01)

(58) Field of Classification Search
CPC ............... G05D 1/0246; G05D 1/0278; G05D 2107/70; G05D 2105/93; G06T 7/13;
(Continued)

(56) References Cited

U.S. PATENT DOCUMENTS 10,232,775 B2 * 3/2019 Tsutsumi .................. B60L 5/00
2003/0135602 A1 * 7/2003 Shike .................. G06Q 10/107
709/223
(Continued)

FOREIGN PATENT DOCUMENTS

CN 107967473 B 9/2021
JP 2017-224935 A 12/2017

OTHER PUBLICATIONS

Wang, M., et al., "A UAV Visual Relocalization Method Using Semantic Object Features Based on Internet of Things," Wireless Communications and Mobile Computing, Wiley, Hindawi, 11 pages (2022).
(Continued)

*Primary Examiner* — Fadey S. Jabr
*Assistant Examiner* — Faris Asim Shaikh
(74) *Attorney, Agent, or Firm* — Baker Botts L.L.P.

(57) ABSTRACT

A technique of executing a task related to a target object robustly against a change in a visual feature is provided. A task execution system includes: a database management unit configured to record in advance a contextual relationship database indicating a spatial contextual relationship of a plurality of objects including a target object; an imaging unit configured to acquire image data that is data obtained by adding, to an image, position information indicating a position at which the image is captured; an object detection unit configured to detect objects from the image; a segmentation unit configured to extract the objects from the image; a contextual relationship extraction unit configured to extract a spatial contextual relationship of the objects extracted from the image; and a task execution unit configured to execute a task related to the target object.

11 Claims, 10 Drawing Sheets

(58) Field of Classification Search

CPC ............. G06T 7/70; G06T 2207/30261; G06T 2207/10028; G06T 7/00; G06T 2207/10016; G06T 2207/30252; G06T 7/248; G06V 2201/06; G06V 10/25; G06V 10/82; G06V 10/94; G06V 10/96; G06V 20/52; G06V 20/58; G06V 20/56; G06V 20/582; G06V 2201/07; G06V 40/103; G06F 18/22; G06F 18/2413; G06F 16/29; G06F 16/9537; G03B 30/00; G03B 19/02; G03B 19/18; G01S 13/931; G01S 13/06; G01S 13/08; G01S 7/4808; G01C 11/04; G01C 21/30; G01C 21/26; G01C 21/3896; G01C 21/3602; G01C 11/06; G01C 3/00; G01C 21/3679; G01C 21/3682; B60W 2420/403; B60W 10/20; B60W 2556/10; H04N 13/221; H04N 13/239; B60K 2360/166; B60K 2360/175; B60K 2360/179

See application file for complete search history.

(56) References Cited

U.S. PATENT DOCUMENTS

| | | | | |
|---|---|---|---|---|
| 2003/0199762 | A1* | 10/2003 | Fritz | G06T 7/60 600/437 |
| 2004/0019405 | A1* | 1/2004 | Ban | G06T 1/0014 700/213 |
| 2008/0267504 | A1* | 10/2008 | Schloter | G06F 16/9554 382/181 |
| 2009/0201365 | A1* | 8/2009 | Fukuoka | A61B 5/442 382/128 |
| 2009/0297038 | A1* | 12/2009 | Ishikawa | G06T 7/74 382/209 |
| 2014/0010477 | A1* | 1/2014 | Kotani | G06T 3/40 382/298 |
| 2014/0241578 | A1* | 8/2014 | Nonaka | G06T 7/62 382/103 |
| 2015/0268058 | A1 | 9/2015 | Samarasekera et al. | |
| 2015/0310313 | A1* | 10/2015 | Murayama | B60K 35/00 382/104 |
| 2017/0301107 | A1* | 10/2017 | Sasaki | B60R 11/0229 |
| 2020/0182625 | A1* | 6/2020 | Yuan | G06F 18/22 |
| 2020/0211379 | A1* | 7/2020 | Quijano | H04W 4/027 |
| 2020/0312008 | A1* | 10/2020 | Cowburn | G06T 7/11 |
| 2021/0158059 | A1* | 5/2021 | Kanzawa | G06V 20/64 |
| 2021/0192682 | A1* | 6/2021 | Tat | G06V 10/141 |
| 2021/0354717 | A1* | 11/2021 | Sakamoto | B60W 40/09 |
| 2021/0403026 | A1* | 12/2021 | Liu | B60W 60/001 |
| 2022/0036117 | A1* | 2/2022 | Cai | G06V 10/443 |
| 2022/0044405 | A1* | 2/2022 | Jenkins | G06F 18/22 |
| 2022/0148302 | A1* | 5/2022 | Bao | G06V 10/761 |
| 2022/0245920 | A1* | 8/2022 | Lyu | G06V 20/41 |
| 2022/0357175 | A1* | 11/2022 | Ollagnier | G01C 21/3623 |
| 2022/0391622 | A1* | 12/2022 | de Steuben | G06V 10/751 |
| 2023/0014874 | A1* | 1/2023 | Shen | G06V 10/82 |
| 2023/0236606 | A1* | 7/2023 | Banerjee | G06V 10/82 701/25 |
| 2023/0286751 | A1* | 9/2023 | Zhao | G06Q 10/087 |

OTHER PUBLICATIONS

Extended European Search Report, mailed Nov. 3, 2023, for EP Application No. 23181392.4.

Communication pursuant to Article 94(3) EPC, mailed Aug. 1, 2025, for European Application No. 23181392.4.

Notice of Reasons for Refusal, mailed Nov. 18, 2025, for Japanese Application No. 2022-120839 (with English translation).

Zhang, et al., Efficient Dynamic Object Search in Home Environment by Mobile Robot: *A Priori* Knowledge-Based Approach, IEEE Transaction Vehicular Technology, vol. 68, No. 10, Oct. 2019.

* cited by examiner

*FIG. 3*

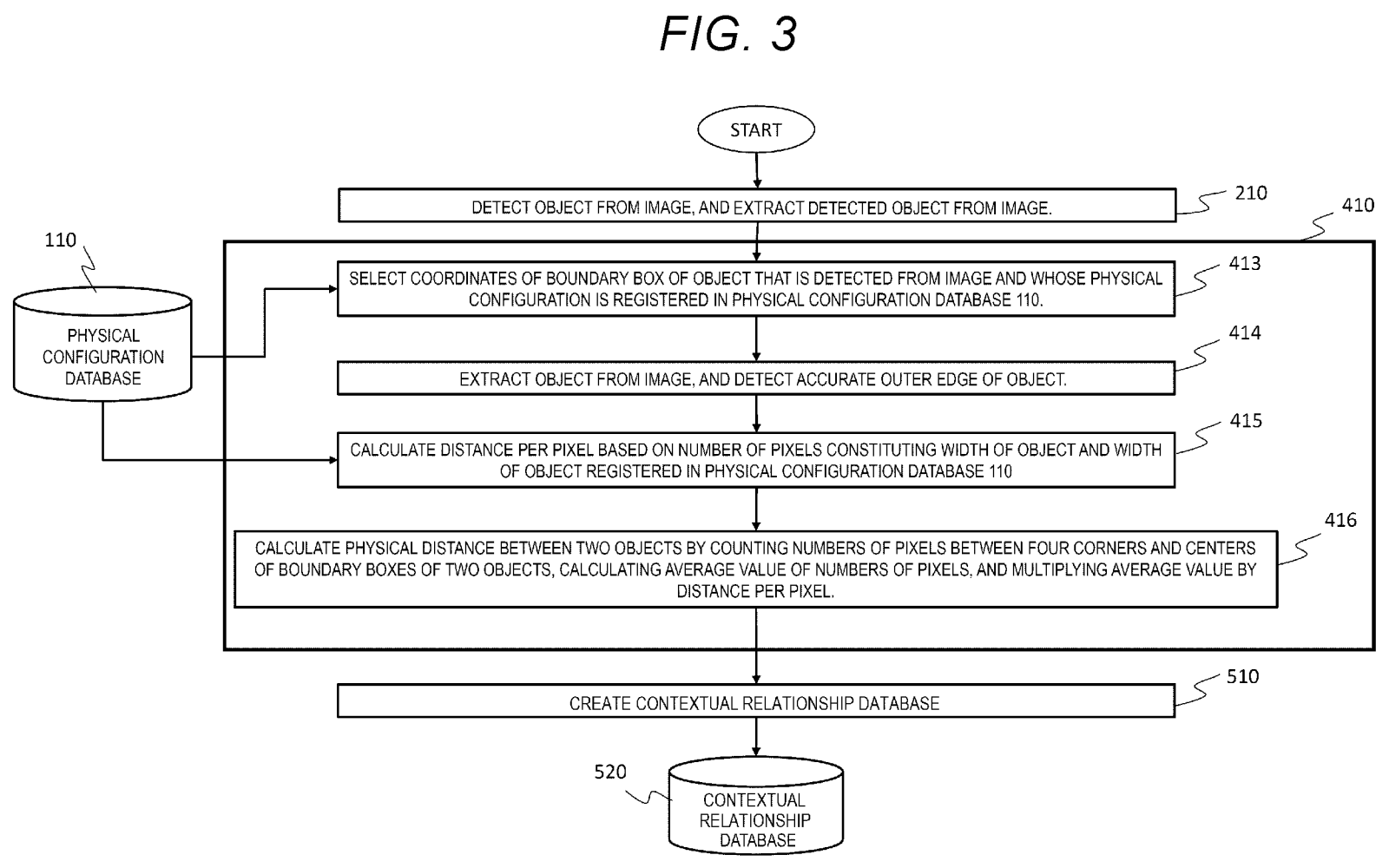

START

DETECT OBJECT FROM IMAGE, AND EXTRACT DETECTED OBJECT FROM IMAGE. — 210

SELECT COORDINATES OF BOUNDARY BOX OF OBJECT THAT IS DETECTED FROM IMAGE AND WHOSE PHYSICAL CONFIGURATION IS REGISTERED IN PHYSICAL CONFIGURATION DATABASE 110. — 413

EXTRACT OBJECT FROM IMAGE, AND DETECT ACCURATE OUTER EDGE OF OBJECT. — 414

CALCULATE DISTANCE PER PIXEL BASED ON NUMBER OF PIXELS CONSTITUTING WIDTH OF OBJECT AND WIDTH OF OBJECT REGISTERED IN PHYSICAL CONFIGURATION DATABASE 110 — 415

CALCULATE PHYSICAL DISTANCE BETWEEN TWO OBJECTS BY COUNTING NUMBERS OF PIXELS BETWEEN FOUR CORNERS AND CENTERS OF BOUNDARY BOXES OF TWO OBJECTS, CALCULATING AVERAGE VALUE OF NUMBERS OF PIXELS, AND MULTIPLYING AVERAGE VALUE BY DISTANCE PER PIXEL. — 416

CREATE CONTEXTUAL RELATIONSHIP DATABASE — 510

410

PHYSICAL CONFIGURATION DATABASE — 110

CONTEXTUAL RELATIONSHIP DATABASE — 520

*FIG. 5*

CONTEXTUAL RELATIONSHIP DATABASE

521

| PRIMARY KEY | OBJECT | ESSENTIAL | NON-ESSENTIAL | CONTEXTUAL RELATIONSHIP |
|---|---|---|---|---|
| GPS POSITION | <E1, E2, ..., > | <E9, E12,...> | <.....> | <E2 E8> DIAGONAL FROM EACH OTHER<br><E3, E7> DIAGONAL FROM EACH OTHER<br><(E1, E2, E3, E4, E5)-(E6, E7, E8, E9)> ON OPPOSITE SIDES<br><E2-E7> FACE EACH OTHER<br><E1, E2> CLOSEST ON SAME SIDE<br><E3, E5> SECOND CLOSEST ON SAME SIDE |

Figure 6:
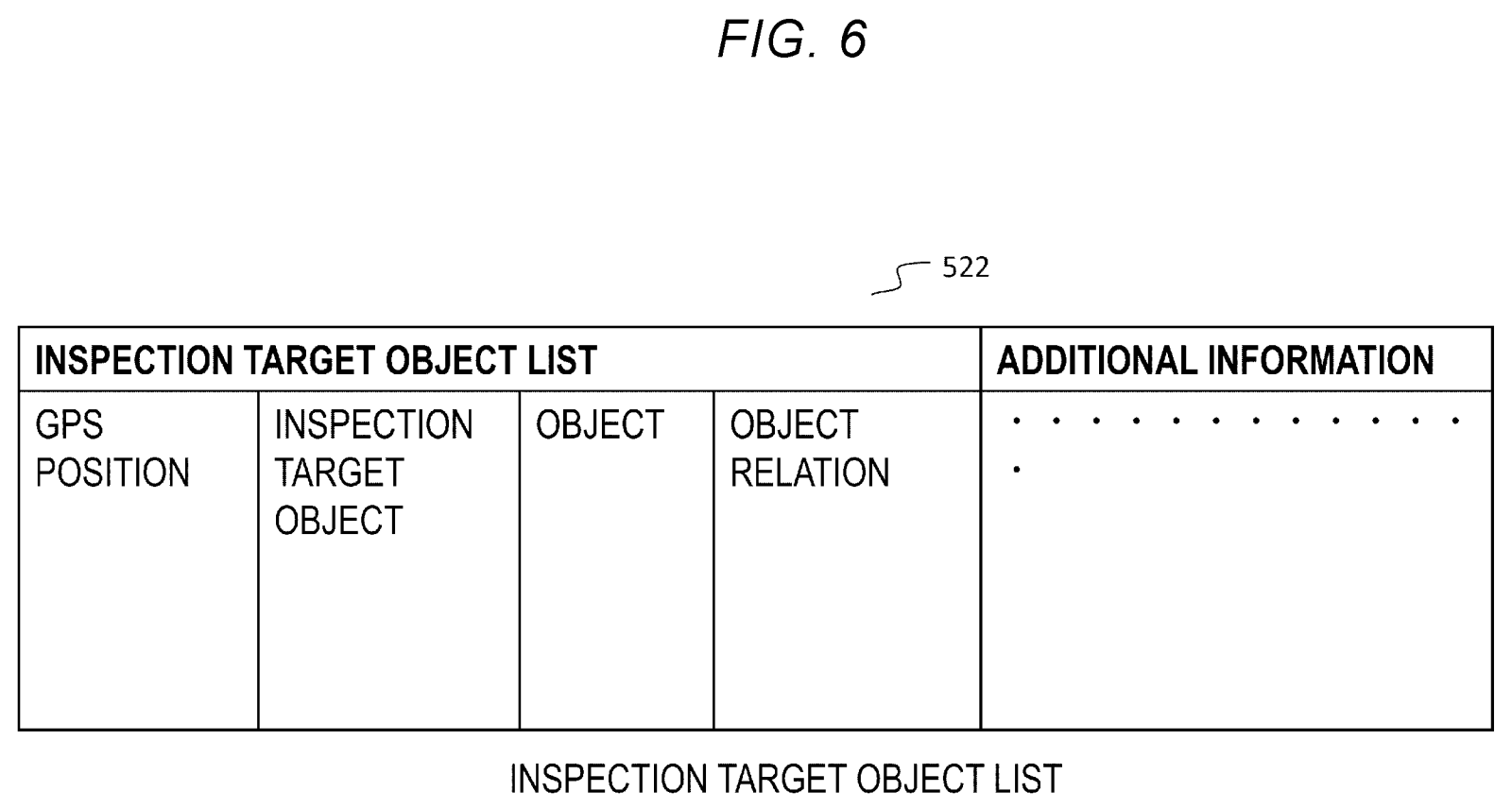

| INSPECTION TARGET OBJECT LIST | | | ADDITIONAL INFORMATION |
|---|---|---|---|
| GPS POSITION | INSPECTION TARGET OBJECT | OBJECT | OBJECT RELATION | · · · · · · · ·<br>· · · · · · ·<br>· · |

INSPECTION TARGET OBJECT LIST

*FIG. 7*

| OBJECT RELATION | | | | | | | | | | | | | | | | | | 523 | |
|---|---|---|---|---|---|---|---|---|---|---|---|---|---|---|---|---|---|---|---|
| OBJECT LABEL | GPS POSITION | L-1 D-1 | L-2 D-2 | L-3 D-3 | R-1 D-1 | R-2 D-2 | R-3 D-3 | U-1 D-1 | U-2 D-2 | U-3 D-3 | Dw-1 D-1 | Dw-2 D-2 | Dw-3 D-3 | Dia-1 D-1 | Dia-2 D-2 | XY COOR-DINATES | ESSENTIAL (Yes/No) | INSPECTION TARGET OBJECT (Yes/No) |

*FIG. 8*

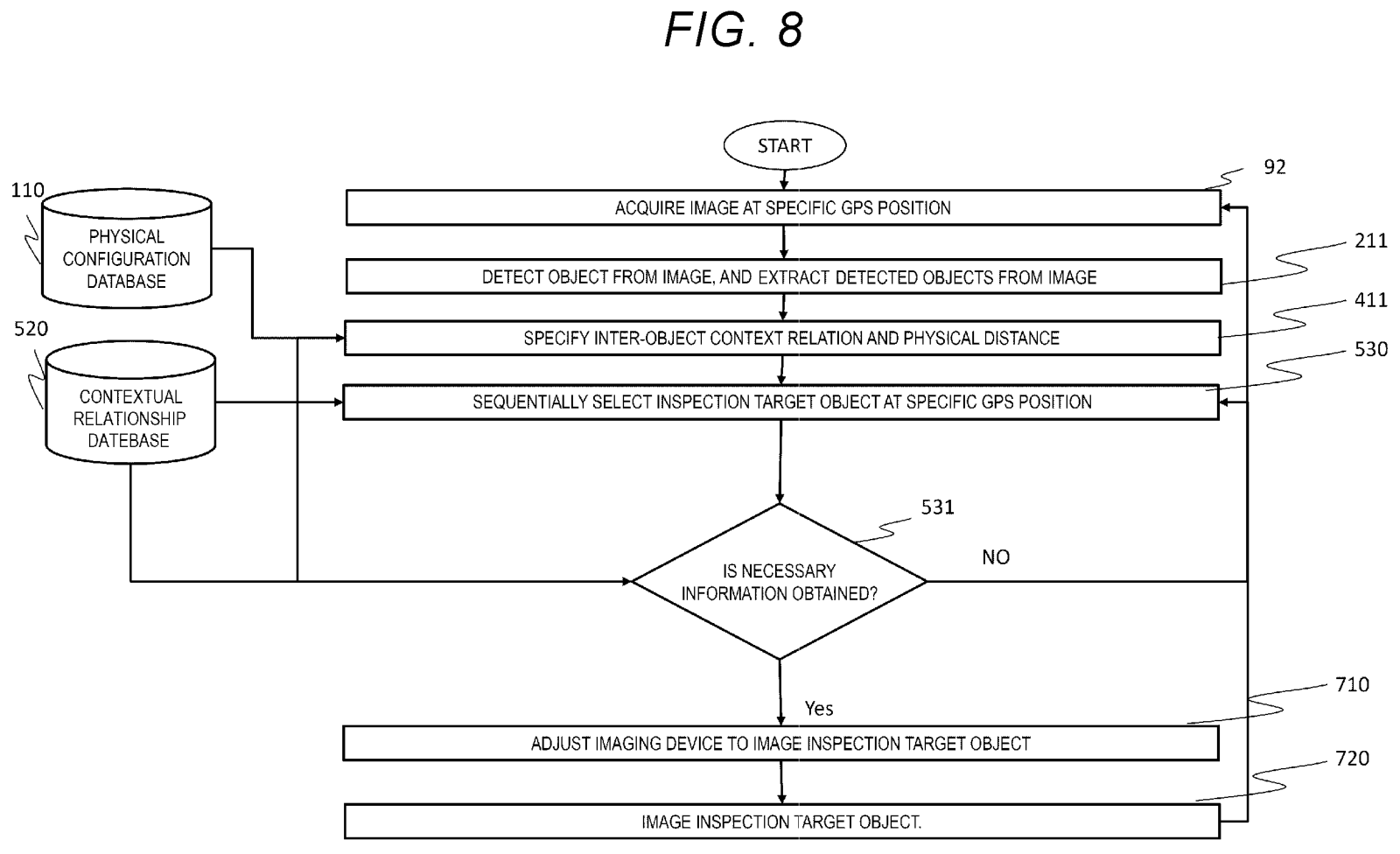

START

ACQUIRE IMAGE AT SPECIFIC GPS POSITION — 92

DETECT OBJECT FROM IMAGE, AND EXTRACT DETECTED OBJECTS FROM IMAGE — 211

SPECIFY INTER-OBJECT CONTEXT RELATION AND PHYSICAL DISTANCE — 411

SEQUENTIALLY SELECT INSPECTION TARGET OBJECT AT SPECIFIC GPS POSITION — 530

IS NECESSARY INFORMATION OBTAINED? — 531

NO

Yes

ADJUST IMAGING DEVICE TO IMAGE INSPECTION TARGET OBJECT — 710

IMAGE INSPECTION TARGET OBJECT. — 720

PHYSICAL CONFIGURATION DATABASE — 110

CONTEXTUAL RELATIONSHIP DATEBASE — 520

TASK EXECUTION SYSTEM, TASK EXECUTION METHOD, AND TASK EXECUTION PROGRAM

BACKGROUND OF THE INVENTION

1. Field of the Invention

The present disclosure relates to a task execution system, a task execution method, and a task execution program.

2. Description of Related Art

Under the shortage of manpower and the decrease in the number of skilled workers, it is recommended to introduce a visual inspection system using a moving body that autonomously acquires information to ensure safety of various facilities. In the visual inspection system, the moving body equipped with various sensors moves in the facilities to acquire various sensor information, and further images an inspection target to acquire an image. Examples of the sensor include an RGB camera, an infrared ray camera, and a voice sensor. Examples of the moving body include a mobile vehicle, a robot dog, and a crawler robot.

The moving body periodically and autonomously goes to an inspection target place to acquire an image including an inspection target object and sends the image to the visual inspection system. The visual inspection system inspects a state of the inspection target object based on the image. The moving body goes to the inspection target place based on position information obtained by a global positioning system (GPS), for example. However, since the position information from the GPS has an error of 30 cm to 5 m, the moving body does not always reach the same position each time and it is difficult to accurately image the inspection target object. Further, the GPS may not function well indoors or the like.

Visual SLAM technology may be used to navigate the moving body in a facility where the GPS does not function. However, visual SLAM technology not only leaves a positional error of 20 to 30 cm, but also has a high load of calculation for matching a visual feature with high accuracy, and thus may be incapable of causing the moving body to reach the inspection target place in a desired inspection cycle.

Because of these problems, currently, it is general to prepare in advance a template image obtained by imaging the inspection target object, adjust positions of the moving body and the camera thereof such that visual features of the template image and the image captured at the inspection target place to which the moving body goes based on the position information of the GPS match with each other, and then image the inspection target object.

However, it is considered that the visual feature of the image largely changes when the inspection target object is damaged, lost, or blocked by an external object (leaf, snow, dust, bird, flying object, or the like), or a background of the inspection target changes depending on a season (grass, clump, dynamic object, environmental change, or the like), and further when a natural disaster (typhoon, flood, fire, earthquake, or the like) occurs. When the visual feature of the image is largely changed, it is also difficult to perform the matching based on the visual feature, and not only the inspection target object to be imaged cannot be imaged, but also an occurrence of serious damage to the inspection target object cannot be detected.

PTL 1 discloses a technique of recognizing an object from an image, acquiring semantic information on a character from the object, and correctly guiding a mobile intelligent device such as a service robot by using the information Non-PTL 1 discloses a method for specifying a position of an unmanned aerial device by matching scenes based on semantic information extracted from an image captured in real-time and an image stored in advance. The matching of the scenes is performed using the semantic information, a position of the object, and a topological structure of an object arrangement as elements.

CITATION LIST

Patent Literature

PTL 1: CN107967473B

Non Patent Literature

NPL 1: Wand M, Wang H, Wang Z, Li Y, "A UAV Visual Relocalization Method Using Semantic Object Features Based on Internet of Things", Wireless Communications and Mobile Computing. 2000 Feb. 11; 2022.

SUMMARY OF THE INVENTION

The visual inspection system using the moving body that autonomously collects information as described above is required to function robustly even in a situation where the visual feature largely changes, such as a loss of the inspection target object or another object. However, the technique disclosed in PTL 1 does not consider how to specify the position when an environmental change occurs in a guidance path of the mobile intelligent device. In the method disclosed in Non-PTL 1, it is not assumed to detect a loss or damage of a specific object.

One object of the present disclosure is to provide a technique of executing a task related to a target object robustly against a change in a visual feature.

A task execution system according to one aspect of the present disclosure includes: a database management unit configured to record in advance a contextual relationship database indicating a spatial contextual relationship of a plurality of objects including a target object; an imaging unit configured to acquire image data that is data obtained by adding, to an image, position information indicating a position at which the image is captured; an object detection unit configured to detect objects from the image; a segmentation unit configured to extract the objects from the image; a contextual relationship extraction unit configured to extract a spatial contextual relationship of the objects extracted from the image; and a task execution unit configured to execute a task related to the target object based on the contextual relationship of the objects extracted from the image and the contextual relationship recorded in the contextual relationship database.

According to one aspect of the present disclosure, the task related to the target object is executed based on the spatial contextual relationship of the objects, and thus it is possible to realize processing robust against a change in a visual feature.

BRIEF DESCRIPTION OF THE DRAWINGS

FIG. 3 is a flowchart of inter-object physical distance calculation;

FIG. 5 is a table showing an example of the contextual relationship database;

FIG. 6 is a table showing an example of an inspection target object list in the contextual relationship database;

FIG. 7 is a table showing an example of an object relation in the contextual relationship database;

FIG. 8 is a flowchart of first inspection target object imaging;

DESCRIPTION OF EMBODIMENTS

Hereinafter, embodiments will be described with reference to the drawings.

The present embodiments show an example in which input data is an image, and the input data is not limited to image data. The input data may be other media data such as video data.

In the present embodiments, a visual inspection system is exemplified in which the image data is acquired around a predetermined area in a predetermined inspection cycle and a visual inspection of an inspection target object is performed based on the image, and a target task is not limited to the visual inspection. A technique included in the present disclosure can be widely used in systems that execute other tasks, such as generation of a report notifying damage of a target object, vehicle navigation, guidance of a robot that moves in a facility, and guidance of a robot that moves in an open area such as a city.

Embodiment 1

Embodiment 1 will be described with reference to FIGS. 1 to 9.

Figure 1:
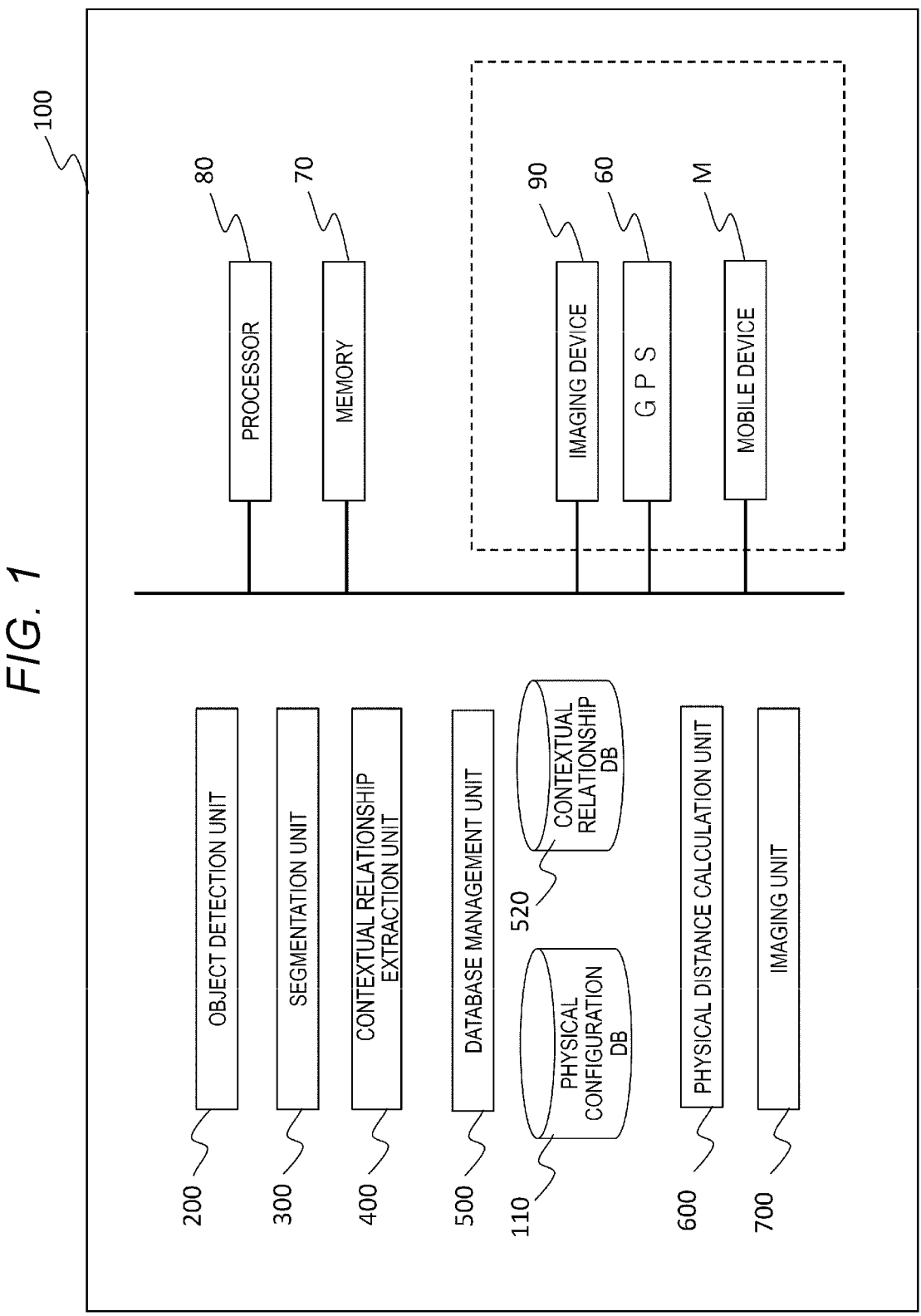
FIG. 1 is a block diagram of a visual inspection system according to Embodiment 1.

FIG. 1 is a block diagram of a visual inspection system according to Embodiment 1.

A visual inspection system 100 is a system that autonomously moves and captures an image at a desired position. The visual inspection system 100 includes an object detection unit 200, a segmentation unit 300, a contextual relationship extraction unit 400, a database management unit 500, a physical distance calculation unit 600, an imaging unit 700, a processor 80, a memory 70, an imaging device 90, a GPS 60, and a mobile device M.

The memory 70 is a storage device that stores a software program and data, and includes a random access memory (RAM), a hard drive, and the like.

The processor 80 is an arithmetic device that executes processing by the software program, and is, for example, a central processing unit (CPU), a graphic processing unit (GPU), or both.

The imaging device 90 is a camera capable of adjusting a view angle and a focal distance. The imaging device 90 acquires an image at desired view angle and focal distance. Image data is obtained by adding, to an image, position information indicating a position at which the image is captured. The imaging device 90 may be, for example, a PTZ camera capable of panning, tilting, and zooming and capable of capturing an image at a wide view angle.

The GPS 60 is a GPS receiver that receives the position information obtained by a global positioning system.

The position information acquired by the GPS 60 is added to the image captured by the imaging device 90. The position information is used for the processing by the software program. The object detection unit 200, the segmentation unit 300, the contextual relationship extraction unit 400, the database management unit 500, the physical distance calculation unit 600, and the imaging unit 700 are processing units implemented by executing software programs by the processor 80.

The movable device M is a device that moves the imaging device 90 and the GPS 60 to desired positions. The movement includes movements performed by various methods, such as traveling on land, flying in the air, sailing on water, and traveling underwater. In the present embodiment, the movable device is a vehicle device that travels on land. The movable device M may use map data including a landmark in addition to the position information acquired by the GPS 60 to travel and move to a position near an inspection target object. Due to an error of the GPS 60 or the like, a deviation may occur in a position where the movable device M reaches or an angle thereof in each inspection round, and thus the visual inspection system 100 adjusts the deviation and performs imaging.

The visual inspection system 100 is, for example, a system including a computer that executes a visual inspection of a target object by the processor 80 executing the processing by the software program using the memory 70. The visual inspection system 100 may be separated into a server device including a computer including the processor 80 and the memory 70, and a moving imaging device including the imaging device 90, the GPS 60, and the movable device M.

The database management unit 500 records a physical configuration database 110 indicating a physical configuration including physical dimensions of a plurality of objects including a target object, and a contextual relationship database 520 indicating a spatial contextual relationship of the plurality of objects including the target object. The physical dimensions such as a height and a width of an object registered in the physical configuration database 110 can be obtained based on a 3D model of the object. In a case in which the object is some equipment, the physical dimensions can be known based on an equipment specification published by a manufacturer of the equipment. In a case in which the object is equipment having a certain size, the physical dimensions can be known based on a design document when the equipment is installed or a measurement result of the equipment. A contextual relationship between objects in a normal state is registered in the contextual relationship database 520 in advance before a cycle of the visual inspection is started. Accordingly, for example, when any device is damaged due to a natural disaster and changes in visual appearance, it is possible to estimate or confirm the damaged article based on a relative position between the damaged article and an undamaged object. Generating the contextual relationship database 520 will be described later.

The object detection unit 200 detects an object from the image as input data acquired by the imaging unit 700 using the imaging device 90. The detection of the object may be performed by a method using a machine learning model based on deep learning, such as single shot multibox detector (SSD), YOLOv4, and YOLOX. The detected object may include the inspection target object.

The physical distance calculation unit 600 calculates a physical distance between the objects detected from the image as the input data.

The segmentation unit 300 extracts the object detected by the object detection unit 200 from the image and specifies an outer edge of the object. The extracting the object from the image may be performed by a method using a machine learning model based on deep learning such as mask R-CNN and BiSNET.

The contextual relationship extraction unit 400 extracts a spatial contextual relationship between the objects extracted from the image by the segmentation unit 300. In this case, the contextual relationship extraction unit 400 may use the inter-object physical distance for extracting the spatial contextual relationship between the objects, and extract a contextual relationship including the inter-object physical distance. In this case, the contextual relationship database 520 also records information on a relation between objects including the physical distance between the objects.

The imaging unit 700 images the inspection target object by the imaging device 90 from a position and a direction specified based on the contextual relationship of the object extracted from the image, which is extracted by the contextual relationship extraction unit 400, and the contextual relationship of the object recorded in the contextual relationship database 520 recorded in advance by the database management unit 500, acquires a visual image, and estimates a state where the target object is normal or abnormal based on the visual inspection image. Obtaining the visual inspection image and estimating the state of the inspection target object are tasks to be performed by the visual inspection system 100 according to the present embodiment. The imaging unit 700 can be said to be a task execution unit that performs the visual inspection of the target object.

Figure 2:
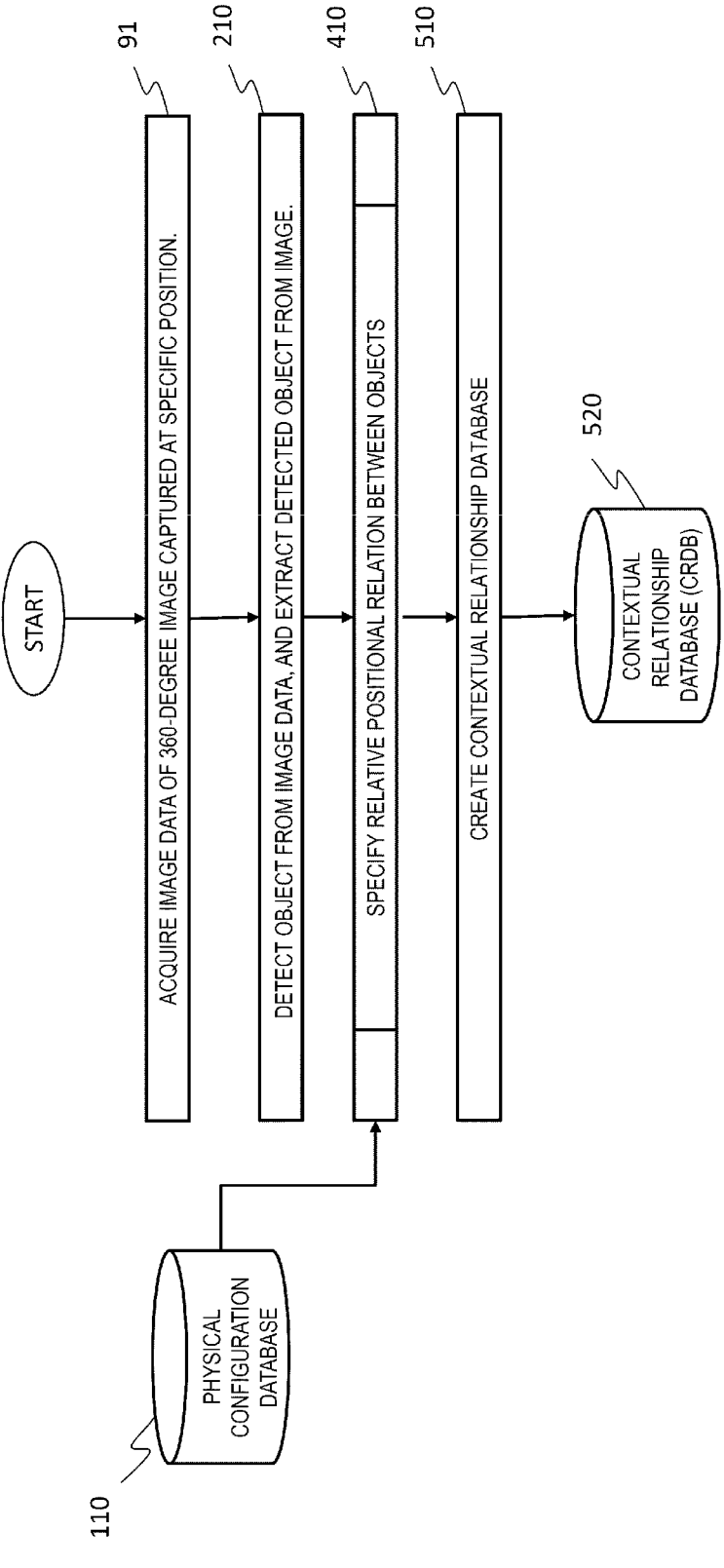
FIG. 2 is a flowchart of contextual relationship database generation.

FIG. 2 is a flowchart of the contextual relationship database generation. The contextual relationship database generation is a process of creating and recording a contextual relationship database in advance.

In step 91, the imaging unit 700 acquires image data of a 360-degree image at a specific position specified by the position information obtained by the GPS 60 by connecting a plurality of images captured at the specific position. The image data stores position information on the specific position in addition to data of the image itself. An example in which a 360-degree image is acquired is shown, and the invention is not limited thereto. In order to extract information on the contextual relationship as much as possible, it is preferable that the acquired image is an image with a wide view angle including objects including the target object.

Next, in step 210, the object detection unit 200 detects an object from the image, and the segmentation unit 300 extracts the detected object from the image and specifies an outer edge of the object.

Next, in step 410, the contextual relationship extraction unit 400 uses the physical distance calculation unit 600 to specify a relative positional relation including the inter-object physical distance based on the physical configuration registered in advance in the physical configuration database 110 and the objects detected and extracted from the image.

FIG. 3 is a flowchart of the inter-object physical distance calculation. The inter-object physical distance calculation is a process of calculating a physical distance between two objects, which is included in the process of step 410 described above.

In step 413, the physical distance calculation unit 600 surrounds, with a boundary box, the object detected from the image and having a physical configuration registered in the physical configuration database 110. The boundary box has a rectangular shape surrounding the object.

In step 414, the physical distance calculation unit 600 performs segmentation to extract the object surrounded by the boundary box from the image, and detects an accurate outer edge of the object.

In step 415, the physical distance calculation unit 600 calculates the number of pixels constituting a width of the accurate outer edge of the object, and calculates an actual physical distance per pixel in the image based on the number of pixels and the width of the object registered in the physical configuration database 110.

In step 416, the physical distance calculation unit 600 calculates the physical distance between the two objects by counting the numbers of pixels between four corners and centers of boundary boxes of the two objects, calculating an average value of the five numbers of pixels, and multiplying the average value by the distance per pixel.

Referring back to FIG. 2, next, in step 510, the database management unit 500 specifies a spatial contextual relationship of a plurality of objects based on the inter-object physical distance and the relative positional relation, and creates the contextual relationship database indicating the inter-object contextual relationship. The contextual relationship may include information on the physical distance.

The inter-object contextual relationship is expressed by an overlap relation in which objects overlap each other, an adjacency relation in which objects are adjacent to each other, a spatial relation in which objects have a space therebetween, a dependency relation in which one object depends on another object, an inclusion relation in which one object is included in another object, or the like. In addition, the inter-object contextual relationship is expressed by a relation in which one object is above another object, a relation in which one object is below another object, a relation in which one object is to the right of another object, a relation in which one object is to the left of another object, a relation in which one object in an oblique direction of another object, a relation in which two objects are diagonal from each other, a relation in which one object is inside another object, a relation in which one object supports another object, or the like.

The contextual relationship database 520 may further store map data representing an arrangement of the inspection target object and a facility, information related to a layout of equipment in the facility, and the like. Such information is useful for understanding a positional contextual relationship and a functional contextual relationship between the facility and objects including the equipment.

Figure 4:
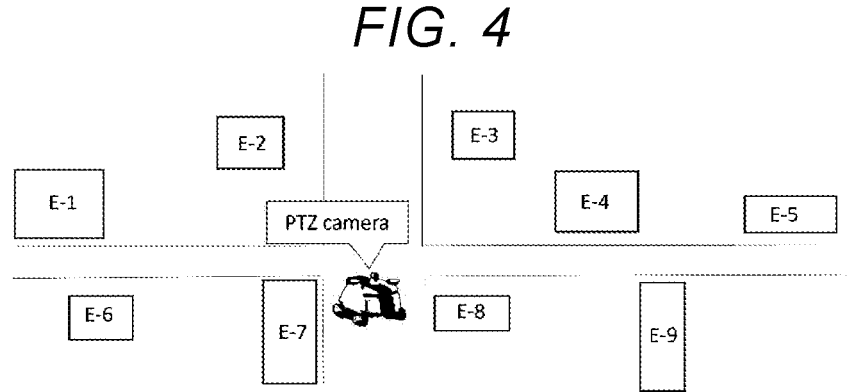
FIG. 4 is a diagram illustrating the contextual relationship database.

FIG. 4 is a diagram illustrating the contextual relationship database.

FIG. 4 illustrates the imaging device 90 at a specific position and a plurality of objects (E-1 to E-9) around the specific position. Each object is granted a name as identification information for identifying the object. The name may be determined using a relative position between the objects and a visual feature of the object. The imaging device 90 may be a mobile device capable of traveling while specifying a position thereof by simultaneous localization and mapping (SLAM).

FIG. 5 is a table showing an example of the contextual relationship database. A table 521 showing the example of the contextual relationship database 520 records information on items including primary key, object, essential, nonessential, and relation in association with each other.

In the item "primary key", the position information (GPS position) on the specific position at which an image is captured is registered as unique information.

In the item "object", names of a plurality of objects of interest are listed. The objects may include the inspection target object.

In the item "essential", names of objects to be necessarily imaged (essential objects) are listed. The essential objects may include the inspection target object such as factory equipment.

In the item "non-essential", names of objects other than the essential objects (non-essential objects) are listed. The non-essential objects may include an object around the inspection target object, such as a tree.

In the item "relation", information indicating the contextual relationship between the objects is registered. For example, the object E2 and the object E8, and the object E3 and the object E7 are registered as diagonal from each other. In addition, the objects E1, E2, E3, E4, and E5 and the objects E6, E7, E8, and E9 are registered as on opposite sides with a road therebetween.

The present embodiment shows an example in which the contextual relationship is extracted from the 360-degree image, and other methods may be used. For example, the contextual relationship may be extracted from a bird's-eye view image or an aerial photograph image. In addition, for example, in a case of a substation, the contextual relationship may be extracted from a facility layout such as a single-line diagram (SLD).

FIG. 6 is a table showing an example of the inspection target object list in the contextual relationship database. The inspection target object list records, for each inspection target object, various kinds of information related to the inspection target object. A table 522 showing an example of the inspection target object list records information on items including GPS position, inspection target object, object, and object relation in association with each other. In the present example, additional information is further added.

The item "GPS position" records the position information (GPS position) of the inspection target object.

In the item "inspection target object", a name and/or identification information of the inspection target object is registered.

In the item "object", information on a type of the inspection target object is registered.

In the item "object relation", information on the physical positional relation between the inspection target object and another object is registered. The object relation may be recorded in a table-in-table form. A detailed example of the object relation will be described later.

The additional information includes information related to the inspection target object, such as information indicating an operation of the inspection target object, change prediction information indicating a prediction on the manner of temporal change of the inspection target object, and information on a risk occurring with the temporal change in the inspection target object.

FIG. 7 is a table showing an example of the object relation in the contextual relationship database. A table 523 records information on items including object label, GPS position, relation information, XY coordinates, essential, and inspection target object.

The item "object label" records the identification information of the object.

The item "GPS position" records information representing the position of the object by position information obtained by GPS.

The item "relation information" records information indicating a relative position of each of the other objects with respect to the object. L indicates an object to the left of the object. R indicates an object to the right of the object. Up indicates an object above the object. Dw indicates an object below the object. D indicates a physical distance. Dia indicates an object diagonal from the object. For example, an object L-1 is located at a position to the left of the object away from the object by a distance D-1. An object L-2 is located at a position to the left of the object away from the object by a distance D-2. An object L-3 is located at a position to the left of the object away from the object by a distance D-3. An object R-1 is located at a position to the right of the object away from the object by the distance D-1. An object R-2 is located at a position to the right of the object away from the object by the distance D-2. An object U-1 is located at a position above the object away from the object by the distance D-1. An object Dw-1 is located at a position below the object away from the object by the distance D-1. An object Dia-1 is located at a position diagonal from the object away from the object by the distance D-1.

The item "XY coordinates" records information representing the position of the object by XY coordinates with a corner of a predetermined device as an origin.

The item "essential" records information indicating a type showing whether the object is an essential object to be necessarily imaged.

The item "inspection target object" records information indicating a type showing whether the object is the inspection target object.

FIG. 8 is a flowchart of first inspection target object imaging. The inspection target object imaging is a process of acquiring an image of the inspection target object used for inspection (inspection image).

In step 92, the imaging unit 700 acquires an image at a specific GPS position.

In step 211, the object detection unit 200 detects an object from the image, and the segmentation unit 300 extracts the detected object from the image and specifies an outer edge of the object.

Next, in step 411, the contextual relationship extraction unit 400 uses the physical distance calculation unit 600 to specify an inter-object contextual relationship and physical distance based on the physical configuration registered in the physical configuration database 110 and the object detected and extracted from the image.

In step 530, the database management unit 500 sequentially selects information on the inspection target object at the specific GPS position from the contextual relationship database 520.

In step 531, the database management unit 500 determines whether information necessary for imaging the inspection image of the inspection target object is obtained based on the information on the contextual relationship related to the inspection target object at the specific GPS position, which is selected from the contextual relationship database 520, the physical configuration of the inspection target object registered in the physical configuration database 110, and the inter-object contextual relationship and physical distance specified in step 411. The inspection image is an image used for inspecting a visual appearance of the inspection target object, and is required to be an image obtained by accurately imaging the inspection target object at a fixed position.

At this time, if a relation between a current position of the imaging device 90 and a position of the inspection target object can be specified based on the information on the contextual relationship related to the inspection target object at the specific GPS position, which is selected from the contextual relationship database 520, the physical configuration of the inspection target object registered in the physical configuration database 110, and the inter-object contextual relationship and physical distance specified in step 411, it is determined that the information necessary for capturing the inspection image is obtained.

In a case in which the information necessary for capturing the inspection image is not obtained, the database management unit 500 returns to step 92.

In a case in which the information necessary for capturing the inspection image is obtained, in step 710, the imaging unit 700 adjusts various parameters including the position of the imaging device 90 to properly image the inspection target object.

In step 720, the imaging unit 700 captures the inspection image of the inspection target object by the imaging device 90. When a plurality of inspection target objects to be imaged at the GPS position are present, the next inspection target object is selected and the process is repeated from the beginning.

Figure 9:
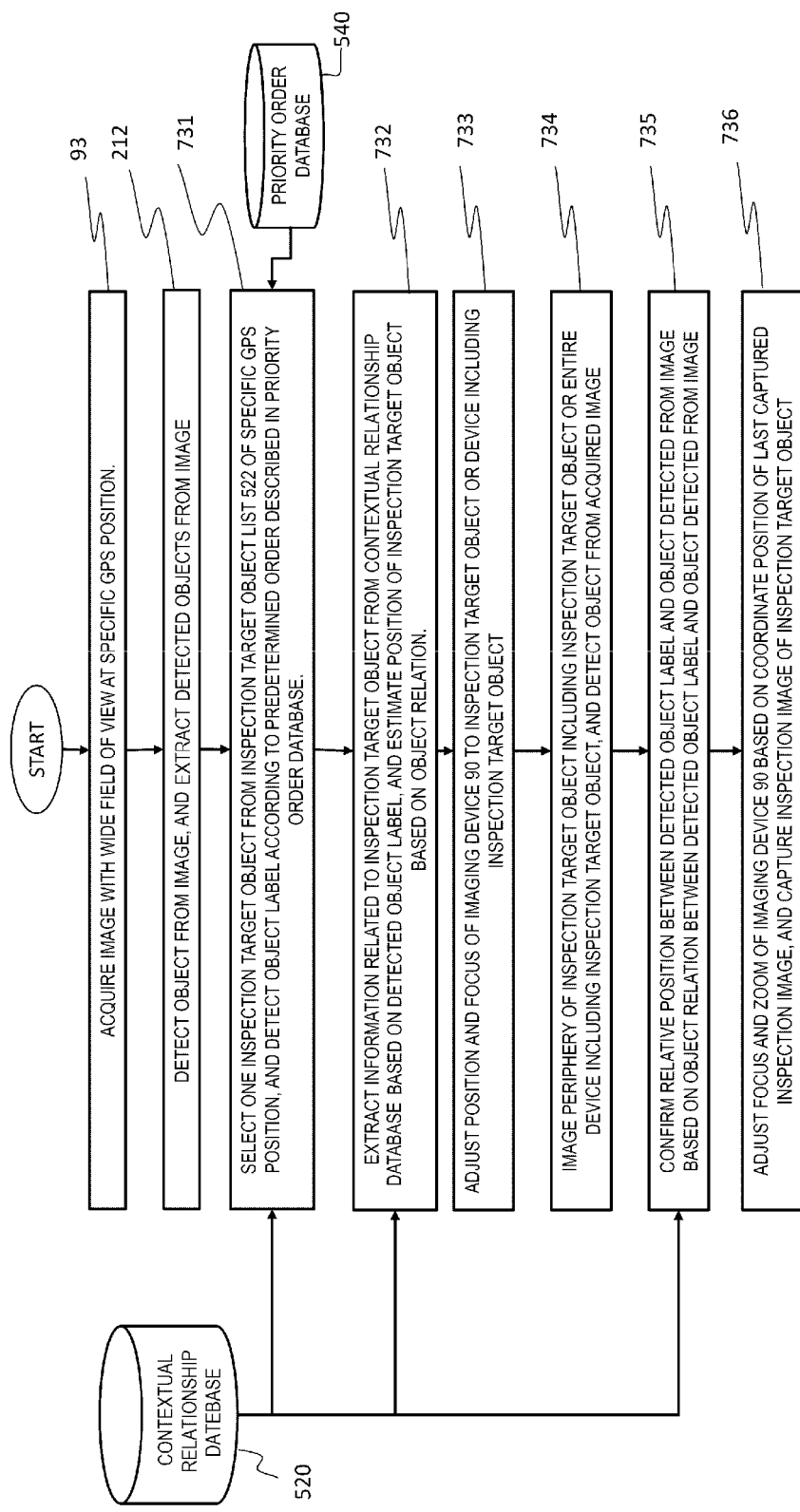
FIG. 9 is a flowchart of second inspection target object imaging.

FIG. 9 is a flowchart of second inspection target object imaging.

In step 93, the imaging device 90 acquires an image with a wide view angle at the specific GPS position. Acquiring the image with the wide view angle makes it easier to detect multiple objects appearing in the contextual relationship database 520 from the image and obtain the information necessary for capturing the inspection image from the contextual relationship database.

In step 212, the object detection unit 200 detects the objects from the image, and the segmentation unit 300 extracts the detected objects from the image and specifies an outer edge of the object. When a plurality of objects are detected, segmentation is individually performed on all the objects.

In step 731, the imaging unit 700 selects one of the objects detected from the image captured at the specific GPS position, refers to the object relation table 523 included in the inspection target object list table 522 according to a predetermined priority order, and detects the object label in the table 523. The priority order of the object label may be registered in advance in the visual inspection system 100 as a priority order database 540.

In step 732, the imaging unit 700 extracts relation information related to the inspection target object from the table 523 of the contextual relationship database 520 based on the object label detected in step 731, and estimates the relation between the current position of the imaging device 90 and the position of the inspection target object based on information on a relative position of the object appearing in the extracted relation information with respect to the inspection target object.

In step 733, the imaging unit 700 adjusts the position and focus of the imaging device 90 to the inspection target object or a device including the inspection target object based on the estimated positional relation.

In step 734, the imaging unit 700 images a periphery of the inspection target object including the inspection target object or an entire device including the inspection target object, and detects an object from the acquired image using the object detection unit 200.

In step 735, the imaging unit 700 confirms a relative position between the detected object label and the object detected from the image based on the object relation in the table 523 between the detected object label and the object detected from the image in step 734.

In step 736, the imaging unit 700 adjusts the focus and zoom of the imaging device 90 based on a coordinate position of a last captured inspection image, and captures an inspection image of the inspection target object.

As described above, Embodiment 1 detects the inspection target object and understanding the contextual relationship between the inspection target object, and objects around the inspection target object and the inspection targets. Thereby, when compared with a visual-based feature matching approach, Embodiment 1 captures and images the inspection target object at a low computational cost, and is robust against a change in visual feature that may occur due to weather, environmental change, natural disaster, accident, or the like.

In the visual inspection system 100 according to Embodiment 1, as shown in the table 522, the database management unit 500 may record in advance the target object additional information indicating the behavior and/or the property of the inspection target object, and accumulate the image data of the inspection image in time series as history image data together with date and time information when the image data is captured. In this case, the imaging unit 700 may capture an image at a target place specified based on the contextual relationship of the object extracted from the image captured at a wide view angle and the contextual relationship recorded in the contextual relationship database 520, and estimate the state of the inspection target object based on the acquired target place image, the history image data, and the target object additional information.

In Embodiment 1, the database management unit 500 may accumulate the image data of the inspection image in time series as the history image data together with the date and time information when the image data is captured, and the imaging unit 700 may predict a future visual appearance or a life of the inspection target object based on a change tendency of the image of the inspection target object in the history image data. The change tendency of the image of the inspection target object in the history image data means the temporal change of the inspection target object until now.

In Embodiment 1, the database management unit 500 may record in advance spatial arrangement data representing an arrangement and a spatial arrangement of the objects including the inspection target object, and the object detection unit 200 may detect an object from the image based on the image, the contextual relationship, and the spatial arrangement.

In Embodiment 1, the visual inspection system 100 may accept an operation related to the execution of the visual inspection from an operator and display a result of the visual inspection on a user interface accessible via a communication network.

Embodiment 2

Figure 10:
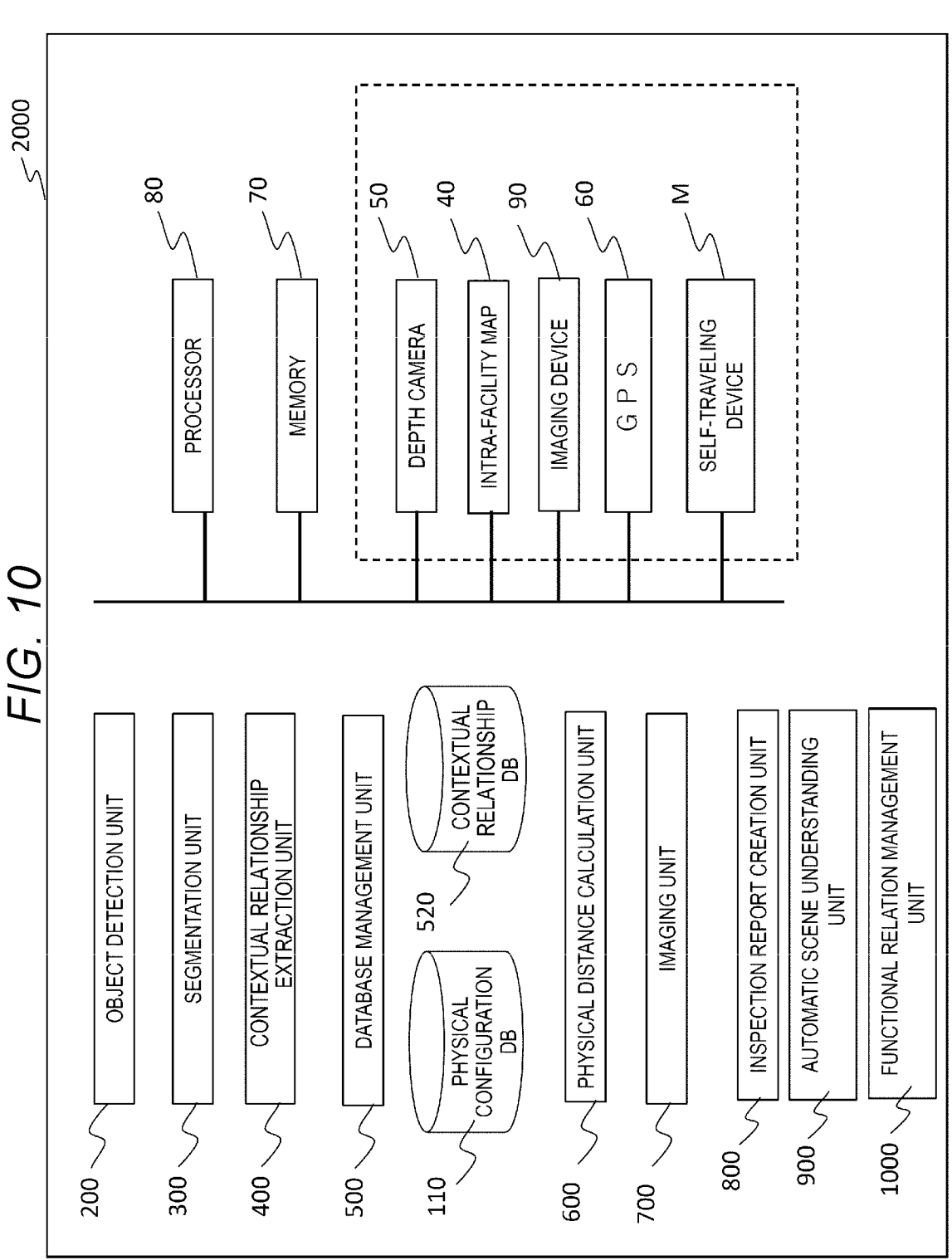
FIG. 10 is a block diagram of a visual inspection system according to Embodiment 2.

FIG. 10 is a block diagram of a visual inspection system according to Embodiment 2.

Embodiment 2 shows a visual inspection system 2000 extended by adding an intra-facility map 40, a depth camera 50, an inspection report creation unit 800, an automatic scene understanding unit 900, and a functional relation management unit 1000 to the visual inspection system 100 according to Embodiment 1. The visual inspection system 2000 according to Embodiment 2 has the same configuration as that of the visual inspection system 100 according to Embodiment 1 except for the extended portions.

The intra-facility map 40 is map data showing a layout of objects in a facility. The map data may be a single-line map or a three-dimensional (3D) map.

The depth camera 50 is a camera capable of measuring a distance. The depth camera 50 is disposed, for example, in the vicinity of the imaging device 90, and can measure a physical distance from the imaging device 90 to an object imaged by the imaging device 90.

For example, when specifying the object detected from the image captured by the imaging device 90 and having a physical configuration registered in the physical configuration database 110 in step 413, the physical distance calculation unit 600 may use the physical distance from the imaging device 90 to the object to specify an object matching the object in the image captured by the imaging device 90 from the objects registered in the physical configuration database 110.

For example, when specifying the inter-object contextual relationship and physical distance based on the physical configuration registered in the physical configuration database 110 and the object detected and extracted from the image in step 411, the contextual relationship extraction unit 400 may use the physical distance from the imaging device 90 to the object to specify an object matching the object in the image from the objects registered in the physical configuration database 110.

In addition, for example, when creating the contextual relationship database 520 in step 510, the contextual relationship extraction unit 400 may create and record the 3D intra-facility map 40 representing a relative positional relation between objects.

For example, the imaging unit 700 may create a 3D map at the time when acquiring the image captured in step 92 and the image captured in step 720, based on the images and the physical distance from the imaging device 90 to the object obtained at the same time when the images are captured.

In addition, for example, the imaging unit 700 may create a 3D map at the time when acquiring the image captured in step 93 and the image captured in step 736, based on the images and the physical distance from the imaging device 90 to the object obtained at the same time when the images are captured.

The inspection report creation unit 800 analyzes the inspection image captured in step 720 or step 736, and creates an inspection report in a format that is readable for a person. For example, it is possible to create an inspection report for notifying that a specific inspection target object in a facility or a device in which the inspection target object is disposed is damaged. In addition, it is possible to create an inspection report for notifying that oil leakage covering about 80% of a surface of the specific inspection target object or the device in which the inspection target object is disposed occurs in the facility.

In step 510, the automatic scene understanding unit 900 supports the database management unit 500 and creates the contextual relationship database 520 indicating the inter-object contextual relationship by a method using a machine learning model based on deep learning. The automatic scene understanding unit 900 can extract a contextual relationship including a semantic meaning, an intention, and content closer to a person, which cannot be directly derived by the object detection and segmentation from an image.

The functional relation management unit 1000 manages functional relation information indicating a mutual functional relation of the inspection target object or the device in which the inspection target object is disposed. The functional relation refers to a relation such as a functional order relation, a dependency relation, and an inclusion relation between objects. For example, a functional relation is present in which a device 2 functions normally only when given an output from a device 1. In addition, a functional relation is present in which there is a high possibility that a part of the device 1 cannot operate when the device 2 fails. For example, since a power of a specific device is turned off, it is possible to understand based on a functional relation that a device cannot be activated unless a power button is pressed. The inspection report creation unit 800 may create the inspection report based on the analysis result of the inspection image and the functional relation information.

In Embodiment 2, the database management unit 500 may record in advance spatial arrangement data representing an arrangement and a spatial arrangement of the objects including the inspection target object, and the imaging unit 700 may output an inspection report in a human-readable format based on the contextual relationship and the spatial arrangement.

Embodiments including Embodiments 1 and 2 described above include the following items. However, the matters included in the present embodiment are not only limited to the following items.

Item 1

A task execution system includes:

a database management unit configured to record in advance a contextual relationship database indicating a spatial contextual relationship of a plurality of objects including a target object;

an imaging unit configured to acquire image data that is data obtained by adding, to an image, position information indicating a position at which the image is captured;

an object detection unit configured to detect objects from the image;

a segmentation unit configured to extract the objects from the image;

a contextual relationship extraction unit configured to extract the spatial contextual relationship of the objects extracted from the image; and a task execution unit configured to execute a task related to the target object based on the contextual relationship of the objects extracted from the image and the contextual relationship recorded in the contextual relationship database.

Accordingly, the task related to the target object is executed based on the spatial contextual relationship of the objects, and thus it is possible to realize processing robust against a change in a visual feature.

Item 2

In the task execution system according to item 1, the database management unit records in advance target object additional information indicating a behavior and/or a property of the target object, and accumulates the image data in time series as history image data together with date and time information when the image data is captured, and the task execution unit captures an image at a target place specified based on the contextual relationship of the object extracted from the image and the contextual relationship recorded in the contextual relationship database, and estimates a state of the target object based on the acquired target place image, the history image data, and the target object additional information.

Accordingly, when the target object changes, it is possible to estimate whether the change is normal or abnormal. For example, in a case in which the target object temporally changes in the additional information, the change can be determined as normal, and in a case in which an abnormal change occurs, it is possible to estimate that the target object is in an abnormal state.

Item 3

In the task execution system according to item 1, the database management unit accumulates the image data in time series as history image data together with date and time information when the image data is captured, and the task execution unit predicts a future visual appearance or a life of the target object based on a change tendency of the image of the target object in the history image data.

Accordingly, since the future visual appearance or the life of the target object is predicted, for example, it is possible to appropriately maintain the target object.

Item 4

In the task execution system according to item 1, the database management unit records in advance spatial arrangement data representing an arrangement and a spatial arrangement of the objects including the target object, and the object detection unit detects an object from the image based on the image, the contextual relationship, and the spatial arrangement.

Accordingly, it is possible to detect an object having a changed visual feature.

Item 5

In the task execution system according to item 1, the database management unit records in advance spatial arrangement data representing an arrangement and a spatial arrangement of the objects including the target object, and the task execution unit outputs an inspection report in a human-readable format based on the contextual relationship and the spatial arrangement.

Accordingly, it is possible to obtain a report related to the target object expressed by using the spatial contextual relationship and the spatial arrangement of the objects.

Item 6

In the task execution system according to item 1, the task execution system accepts an operation related to execution of a task from an operator and displays a result of the execution of the task is performed on a user interface accessible via a communication network.

Accordingly, the operator can execute the task related to the target object and confirm the execution result using the inspection system via the communication network.

Item 7

In the task execution system according to item 1, the task is a visual inspection of the target object.

Item 8

The task execution system according to item 1 further includes:

a physical distance calculation unit configured to calculate, based on the image data acquired by the imaging unit, a physical distance between the objects detected by the object detection unit, the database management unit records, in the contextual relationship database, a contextual relationship including information on the physical distance between the objects, the contextual relationship extraction unit extracts the contextual relationship including the physical distance, and the task execution unit executes the task based on the contextual relationship including the physical distance between the objects.

Accordingly, the task related to the target object is executed based on the contextual relationship including the inter-object physical distance, and thus it is possible to realize processing robust against a change in a visual feature.

Item 9

In the task execution system according to item 8, the database management unit further records in advance a physical configuration database indicating a physical configuration including a physical distance between objects, and the physical distance calculation unit selects an object associated with an object having a physical configuration recorded in the physical configuration database from among the objects extracted from the image, acquires the number of pixels of a width of the selected object in the image, calculates a physical distance per pixel based on the number of pixels and the physical configuration in the physical configuration database, and calculates, based on the physical distance per pixel and the number of pixels between the objects extracted from the image, a physical distance between the objects extracted from the image.

What is claimed is:

1. A task execution system comprising:

a memory configured to store a contextual relationship database indicating a spatial contextual relationship of a plurality of objects including a target object; and a processor configured to:

record in advance the spatial contextual relationship of the plurality of objects including the target object in the contextual relationship database, wherein the spatial contextual relationship of the plurality of objects includes a distance between each of the plurality of objects and at least one other of the plurality of objects;

acquire image data that is data obtained by adding, to an image, position information indicating a position at which the image is captured;

detect objects from the image;

extract the detected objects from the image;

extract spatial contextual relationship of the objects extracted from the image; and execute a task related to the target object based on the extracted spatial contextual relationship of the objects extracted from the image and the extracted spatial contextual relationship recorded in the contextual relationship database;

wherein the task comprises:

obtaining a new image of an area that includes the target object from a mobile device, calculating a new distance between the target object and at least one other of the plurality of objects using the new image, determining, using at least the new distance, if the spatial contextual relationship between the target object and the at least one other of the plurality of objects has changed, causing the mobile device to travel to a position near the target object, and causing the mobile device to perform a visual inspection of the target object when it is determined that the spatial contextual relationship between the target object and the plurality of objects has changed.

2. The task execution system according to claim 1, wherein the processor is further configured to:
  record in advance target object additional information indicating a behavior and/or a property of the target object, and
  accumulate the image data in time series as history image data together with date and time information when the image data is captured, and
  wherein the task further comprises: capturing the new image at a target place specified based on the extracted spatial contextual relationship of the objects extracted from the image and the extracted spatial contextual relationship recorded in the contextual relationship database, and estimates a state of the target object based on acquired target place image, the history image data, and target object additional information.

3. The task execution system according to claim 1, wherein the processor is further configured to:
  accumulate the image data in time series as history image data together with date and time information when the image data is captured, and
  wherein the task further comprises predicting a future visual appearance or a life of the target object based on a change tendency of the image of the target object in the history image data.

4. The task execution system according to claim 1, wherein the processor is further configured to:
  record in advance spatial arrangement data representing an arrangement and a spatial arrangement of the objects including the target object, and
  wherein detecting objects from the image comprises detecting an object from the image based on the image, the extracted spatial contextual relationship, and the spatial arrangement.

5. The task execution system according to claim 1, wherein the processor is further configured to:
  record in advance spatial arrangement data representing an arrangement and a spatial arrangement of the objects including the target object, and
  wherein the task further comprises outputting an inspection report in a human-readable format based on the extracted spatial contextual relationship and the spatial arrangement.

6. The task execution system according to claim 1, wherein the task further comprises:
  accepting an operation related to execution of a task from an operator and displays a result of the execution of the task on a user interface accessible via a communication network.

7. The task execution system according to claim 1, wherein
  the task further comprises a visual inspection of the target object.

8. The task execution system according to claim 1, wherein the processor is further configured to:
  calculate, based on the image data, a physical distance between each of the plurality of objects;
  record in the contextual relationship database, a contextual relationship including information on the physical distance between each of the plurality of objects; and
  execute the task based on the contextual relationship including the physical distance between the objects.

9. The task execution system according to claim 8, wherein the memory further stores: a physical configuration database indicating a physical configuration including a physical distance between objects; and the processor is further configured to select an object associated with an object having a physical configuration recorded in the physical configuration database from among the objects extracted from the image, acquires a number of pixels of a width of the selected object in the image, calculates a physical distance per pixel based on the number of pixels and the physical configuration in the physical configuration database, and calculates, based on the physical distance per pixel and the number of pixels between the objects extracted from the image, a physical distance between the objects extracted from the image.

10. A task execution method executed by a computer, the task execution method comprising:
  recording in advance a contextual relationship database indicating a spatial contextual relationship of a plurality of objects including a target object, wherein the spatial contextual relationship of the plurality of objects includes a distance between each of the plurality of objects and at least one other of the plurality of objects;
  acquiring image data that is data obtained by adding, to an image, position information indicating a position at which the image is captured;
  detecting objects from the image;
  extracting the detected objects from the image;
  extracting a spatial contextual relationship of the objects extracted from the image; and
  executing a task related to the target object based on the extracted spatial contextual relationship of the objects extracted from the image and the extracted spatial contextual relationship recorded in the contextual relationship database;
  wherein the task comprises:
    obtaining a new image of an area that includes the target object from a mobile device,
    calculating a new distance between the target object and at least one other of the plurality of objects using the new image,
    determining, using at least the new distance, if the spatial contextual relationship between the target object and the at least one other of the plurality of objects has changed,
    causing the mobile device to travel to a position near the target object, and
    causing the mobile device to perform a visual inspection of the target object when it is determined that the spatial contextual relationship between the target object and the plurality of objects has changed.

11. A non-transitory computer-readable medium storing a program that when executed by a processor cause the processor to:
  record in advance a contextual relationship database indicating a spatial contextual relationship of a plurality of objects including a target object, wherein the spatial contextual relationship of the plurality of objects includes a distance between each of the plurality of objects and at least one other of the plurality of objects;
  acquire image data that is data obtained by adding, to an image, position information indicating a position at which the image is captured;
  detect objects from the image;
  extract the detected objects from the image;
  extract a spatial contextual relationship of the objects extracted from the image; and
  execute a task related to the target object based on the extracted spatial contextual relationship of the objects extracted from the image and the extracted spatial contextual relationship recorded in the contextual relationship database;

wherein the task comprises:

obtaining a new image of an area that includes the target object from a mobile device, calculating a new distance between the target object and at least one other of the plurality of objects using the new image, determining, using at least the new distance, if the spatial contextual relationship between the target object and the at least one other of the plurality of objects has changed, causing the mobile device to travel to a position near the target object, and causing the mobile device to perform a visual inspection of the target object when it is determined that the spatial contextual relationship between the target object and the plurality of objects has changed.

* * * * *